United States Patent
Tamura et al.

(10) Patent No.: US 10,592,679 B2
(45) Date of Patent: Mar. 17, 2020

(54) SUPPORT FOR CHANGING ENCRYPTION CLASSES OF FILES

(71) Applicant: Apple Inc., Cupertino, CA (US)

(72) Inventors: Eric B. Tamura, Sunnyvale, CA (US); Kelly B. Yancey, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 347 days.

(21) Appl. No.: 15/274,724

(22) Filed: Sep. 23, 2016

(65) Prior Publication Data

US 2017/0359175 A1    Dec. 14, 2017

Related U.S. Application Data (60) Provisional application No. 62/348,805, filed on Jun. 10, 2016.

(51) Int. Cl.
    *G06F 21/62*      (2013.01)
    *H04L 9/08*      (2006.01)

(52) U.S. Cl.
    CPC .......... *G06F 21/6209* (2013.01); *H04L 9/088* (2013.01); *H04L 9/0891* (2013.01); *H04L 9/0894* (2013.01)

(58) Field of Classification Search
    CPC ............... G06F 21/6209; G06F 21/602; G06F 21/6218; G06F 17/30182; G06F 17/3012; H04L 9/16; H04L 9/0861; H04L 9/0891; H04L 9/088; H04L 9/0894
    See application file for complete search history.

(56) References Cited

U.S. PATENT DOCUMENTS

| | | | |
|---|---|---|---|
| 9,037,870 B1 * | 5/2015 | Zheng | G06F 12/1408 380/273 |
| 9,576,144 B2 * | 2/2017 | Bruso | G06F 21/6218 |
| 9,894,069 B2 * | 2/2018 | Weaver | G06F 21/6218 |
| 2008/0123843 A1 * | 5/2008 | Machani | H04L 9/0822 380/44 |
| 2010/0290623 A1 * | 11/2010 | Banks | G06F 21/6227 380/277 |
| 2011/0022856 A1 * | 1/2011 | Ureche | G06F 21/602 713/193 |

(Continued)

FOREIGN PATENT DOCUMENTS

CA      2905576 A1 *    9/2014    ......... H04L 63/0428

*Primary Examiner* — Hee K Song
(74) *Attorney, Agent, or Firm* — Dickinson Wright RLLP (57) ABSTRACT

Representative embodiments set forth herein disclose techniques for modifying encryption classes of files. According to some embodiments, a technique can include receiving a request to update an encryption configuration of a file from a current encryption class to an updated encryption class. In response, the technique involves obtaining (i) a first class key associated with the current encryption class, and (ii) a second class key associated with the updated encryption class. Next, the technique involves identifying file extents of the file, where each file extent is encrypted by a respective extent key that is encrypted by the first class key. Finally, the technique involves, for each file extent of the file: (i) decrypting the respective extent key using the first class key to produce a decrypted respective extent key, and (ii) encrypting the decrypted respective extent key using the second class key to produce an updated respective extent key.

20 Claims, 9 Drawing Sheets

(56) References Cited

U.S. PATENT DOCUMENTS

| | | | |
|---|---|---|---|
| 2011/0191595 A1* | 8/2011 | Damian | G06F 12/14 |
| | | | 713/189 |
| 2011/0252233 A1* | 10/2011 | De Atley | G06F 11/1458 |
| | | | 713/165 |
| 2011/0252234 A1* | 10/2011 | De Atley | H04L 9/0891 |
| | | | 713/165 |
| 2011/0252243 A1* | 10/2011 | Brouwer | H04L 9/0838 |
| | | | 713/189 |
| 2013/0061035 A1* | 3/2013 | Hook | H04L 9/088 |
| | | | 713/150 |
| 2015/0106626 A1* | 4/2015 | Kremp | H04L 63/06 |
| | | | 713/189 |
| 2015/0127946 A1* | 5/2015 | Miller | G06F 21/6218 |
| | | | 713/171 |
| 2016/0154963 A1* | 6/2016 | Kumar | H04L 9/0825 |
| | | | 713/189 |
| 2016/0239674 A1* | 8/2016 | Bao | H04L 63/0876 |
| 2016/0277373 A1* | 9/2016 | Murray | H04L 63/061 |
| 2016/0323250 A1* | 11/2016 | Winter | H04L 63/0428 |
| 2017/0201373 A1* | 7/2017 | Vijayakumar | H04L 9/0822 |
| 2018/0007048 A1* | 1/2018 | Weaver | G06F 21/6218 |

* cited by examiner

SUPPORT FOR CHANGING ENCRYPTION CLASSES OF FILES

CROSS-REFERENCE TO RELATED APPLICATION

The present application claims the benefit of U.S. Provisional Application No. 62/348,805, entitled "SUPPORT FOR CHANGING ENCRYPTION CLASSES OF FILES" filed Jun. 10, 2016, the content of which is incorporated herein by reference in its entirety for all purposes.

FIELD

The described embodiments relate generally to key-rewrapping techniques for file systems. More particularly, the described embodiments relate to key-rewrapping techniques for transparently modifying encryption classes of files within file systems.

BACKGROUND

The overall availability of personal information of individuals has increased in recent years due to the proliferation of computing devices (e.g., smartphone devices, tablet devices, laptop devices, etc.). Notably, concern over the security of such personal information resulted in the implementation of traditional encryption techniques that make the personal information virtually inaccessible without possession of proper encryption keys (e.g., encryption keys based on user passcodes). Although, in general, these traditional encryption techniques could previously thwart malicious parties from accessing personal information on computing devices, modern hacking techniques present new challenges that need to be addressed. For example, malicious software can be utilized to rapidly generate "guess" passwords and enter them on a computing device as a brute-force technique for eventually guessing the correct password assigned on the computing device. As a result, computing devices having personal information protected by traditional encryption techniques/weak passcodes can be compromised and lead to data breaches, identity theft, and the like.

SUMMARY

Representative embodiments set forth herein disclose techniques for transparently modifying encryption classes of files within file systems. According to some embodiments, a technique can include receiving a request to update an encryption configuration of a file from a current encryption class to an updated encryption class. In response to the request, the technique involves obtaining (i) a first class key associated with the current encryption class, and (ii) a second class key associated with the updated encryption class. Next, the technique involves identifying file extents of the file, where each file extent is encrypted by a respective extent key, and each respective extent key is encrypted by the first class key. Finally, the technique involves, for each file extent of the file: (i) decrypting the respective extent key using the first class key to produce a decrypted respective extent key, and (ii) encrypting the decrypted respective extent key using the second class key to produce an updated respective extent key. In this manner, the encryption class assigned to the file is transparently modified in an efficient and robust manner.

Other embodiments include a non-transitory computer readable storage medium configured to store instructions that, when executed by a processor included in a computing device, cause the computing device to carry out the various steps of the foregoing method. Further embodiments include a computing device that is configured to carry out the various steps of the foregoing method.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

Encryption of data has helped to securely establish a global network of computing devices in which sharing of the data can be accomplished with minimal risk of the theft or fraud. However, the popularity of many computing devices such as smartphones, tables, laptops, etc.—combined with the prevalence of hacking—has established a need to make the data more secure. Despite efforts and investments made to provide more secure computing device architectures, data can be compromised by malicious software designed to discover keys that are used to secure the data.

To address the foregoing issues, the embodiments described herein set forth a key manager that is configured to implement various techniques. In particular, a "key rewrapping" technique implemented by the key manager involves transparently modifying an encryption class of a file at a computing device from a current encryption class to an updated encryption class. In particular, a class key associated with a current encryption class of the file can be used to decrypt (encrypted) extent keys that are used to encrypt file extents that make up the file. In turn, the one or more decrypted extent keys of the file extents can be re-encrypted using a class key associated with the updated encryption class. In this manner, the encryption class of the file can be transparently updated while maintaining the one or more extent keys associated with the file extents.

The key manager described herein can also implement a "key rolling" technique that involves replacing the (current) file extent keys of a file with updated file extent keys in conjunction with the key rewrapping techniques described herein. In particular, when a file extent key is decrypted (using the current class key), the corresponding data of the file can be decrypted using the file extent key, and then re-encrypted using a new file extent key. The decryption/encryption of the file extent can also involve migrating the data of the file extent to a new location in memory. In turn, the new file extent key can be encrypted using the class key associated with the updated encryption class. When this key rolling technique is carried out, metadata of the file can be updated to indicate that the file extents are located in their respective new locations in memory. Moreover, for each file extent of the file, the metadata can be updated to indicate that the file extent is encrypted with the new extent key, and that the respective extent key is encrypted with the class key associated with the updated encryption class.

It is noted that although the techniques set forth herein primarily involve utilizing the same extent key for the file extents of a file, the embodiments described herein are not so limited. In particular, the embodiments can involve generating multiple new extent keys when decrypting/encrypting the file extents in conjunction with key rolling procedures (where, subsequent to re-encrypting the file extents, the multiple new extent keys are encrypted using the class key associated with the updated encryption class to which the file is being assigned). It is noted that the multiple new extent keys can be used to encrypt the file extents in virtually any manner. In one example, a one-to-one ratio can exist between multiple new extent keys and the file extents such that each file extent is encrypted by its own unique new extent key. In another example, a one-to-many ratio can exist between the multiple new extent keys and the file extents such that a particular new extent key can be used to encrypt multiple file extents, but not all of the file extents of the file.

Additionally, the key manager can track the overall progress of the key rewrapping/rolling techniques described herein by updating metadata associated with the files. According to some embodiments, the metadata can indicate how the file extents of a file are currently encrypted, as well as the encryption class to which the file is currently assigned. For example, when initiating a key rewrapping process for a file, the metadata can be used to identify the file extents that should be re-encrypted with one or more new extent keys when a key rolling process is to be carried out in conjunction with the key rewrapping process. Furthermore, as the key rewrapping process progresses through the file extents, the metadata can be updated to indicate the changes made to the file extents. For example, the metadata can be updated to indicate the new key used to re-encrypt each of the file extents, as well as the new memory locations into which the file extents are located after they are re-encrypted. Additionally, measures can be taken to increase the efficiency of the metadata. For example, when the key rewrapping process for the file involves re-encrypting all file extents of the file with the same new extent key, the metadata for the file can include a simplified value that indicates all file extents of the file are encrypted with the same new extent key, thereby reducing the overall size of the metadata.

Additionally, in some instances it can be beneficial to perform key rolling in a non-sequential manner such that certain file extents of a file are skipped or addressed in an out-of-order fashion. For example, if key rolling is to be performed on a file that is being used by an application, the key manager can skip file extents of the file that are being accessed/modified by the application. In some embodiments, a file can represent a group file that allows a group of individuals to access and edit the file. In particular, the file can be encrypted with multiple extent keys, and each person in the group can have access to the multiple extent keys. When updates are made to the file by one or more individuals in the group, the updated portion (i.e., modified file extents) of the file can be encrypted with one or more extent keys. However, if a person leaves the group and updates are made to the file subsequent to the person leaving the group, a new extent key can be generated and the updated file extents of the file can be encrypted with the new extent key according to the key rolling processes described herein.

Additionally, the key manager can implement a reserve operation for reserving portions of memory for newly encrypted (i.e., re-encrypted) file extents of a file when carrying out a key rolling process in conjunction with a key rewrapping process. More specifically, in order to protect against data loss that can occur from power loss or computer crashes, the key manager can first copy file extents to the reserved portion of memory, thereby maintaining the original file extents as the re-encryption process is executed. As previously described herein, the metadata associated with the file can be updated to indicate where the re-encrypted file extents are stored in memory, as well as information about the extent keys that are used to re-encrypt the file extents. For example, the metadata can indicate (i) before re-encryption, that one or more file extents are encrypted with a current extent key and stored in particular locations in memory, and (ii) after re-encryption, that the one or more file extents are re-encrypted with a new extent key and stored in new locations in memory. As a result, any applications attempting to access the file can identify the appropriate locations/extent keys of the file extents of the file by referencing the metadata associated with the file.

Additionally, the key manager can be scheduled to execute the key rewrapping/rolling processes at different times. For example, the key manager can be scheduled to execute the key rewrapping/rolling processes when a computing device operating the key manager is connected to an external power supply (and power consumption is less of a concern). The key manager can also be scheduled to execute the key rewrapping/rolling processes when the computing device has entered an idle or locked mode, such that a user of the computing device will not be disrupted. In this manner, the impact of the key manager on the power and processing efficiency of the computing device can be mitigated. Additionally, it is noted that the key manager can be scheduled to execute at any suitable time, including when a user is actively operating the computing device. In such a configuration, the key manager can function as a background process for transparently managing the encryption of files in a file system of the computing device, as described herein. Moreover, the key manager can be configured to carry out the various techniques in response to any condition being satisfied, e.g., the computing device being unlocked (e.g., a user entering a passcode, providing a fingerprint, etc.), particular operations occurring within the file system of the computing device (e.g., file cloning, changes to access permissions, etc.), temporal conditions, locale conditions, connection conditions, activity conditions, and so on.

These and other embodiments are discussed below with reference to FIGS. 1-6; however, those skilled in the art will readily appreciate that the detailed description given herein with respect to these figures is for explanatory purposes only and should not be construed as limiting.

Figure 1:
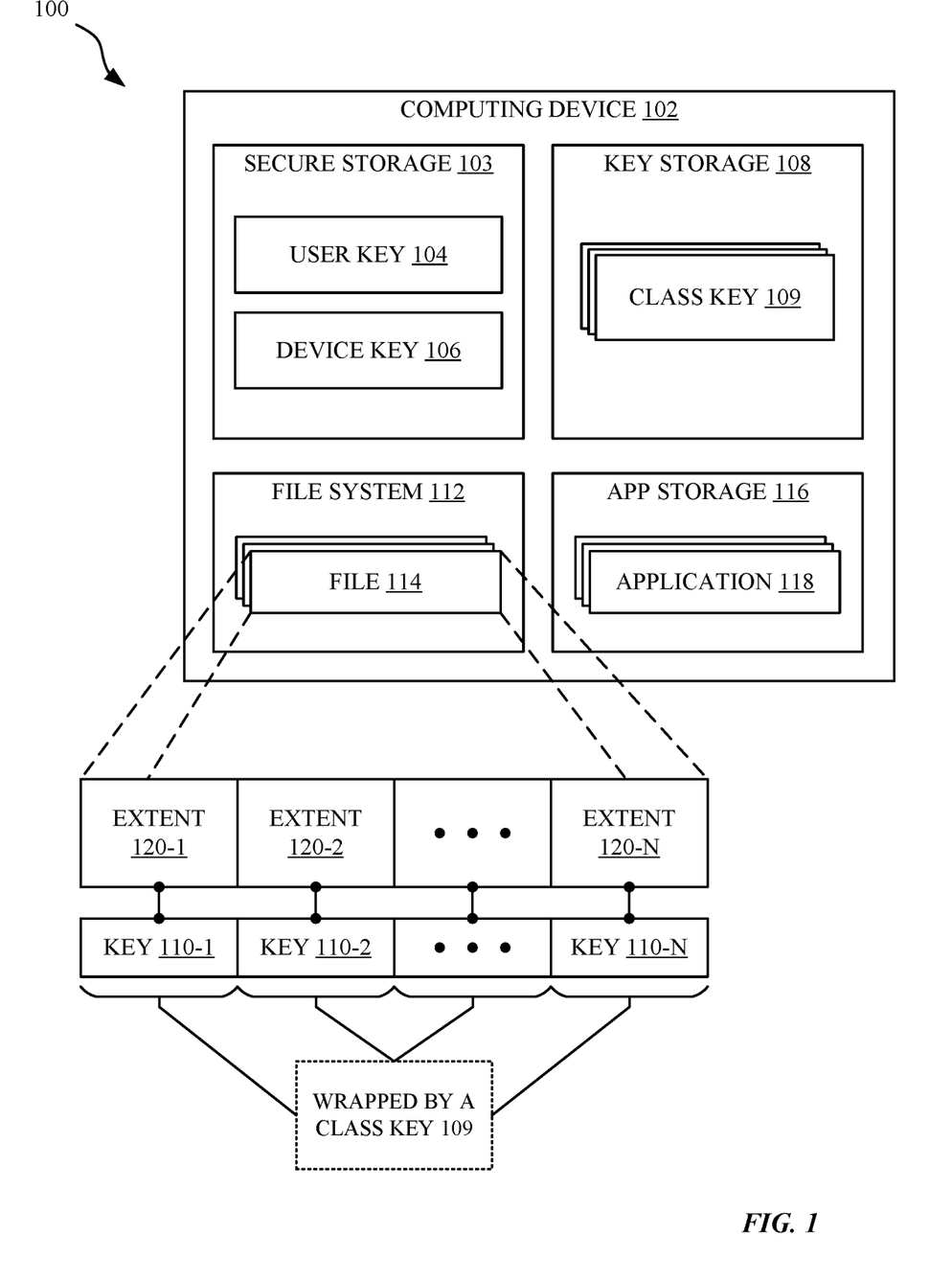
FIG. 1 illustrates a conceptual diagram for a computing device that can be configured to perform the key rewrapping techniques described herein, according to some embodiments.

FIG. 1 illustrates a conceptual diagram 100 for a computing device 102 that can be configured to perform the key rewrapping/rolling techniques described herein, according to some embodiments. The computing device 102 can represent a smartphone, tablet, laptop, desktop, display, watch, media player, or any other computing device 102 suitable for storing encrypted data. As shown in FIG. 1, the computing device 102 can include a secure storage 103 in which a user key 104 and a device key 106 can be used—through the various levels of key management/encryption described herein—to encrypt data (e.g., files 114 of the file system 112) managed by the computing device 102. According to some embodiments, the user key 104 can represent a key that is created by a user or otherwise represents a key that is associated with the user. According to some embodiments, the user key 104 can be generated by the computing device 102 or provided to the computing device 102 through an interface of the computing device 102. In this manner, the user can be required to enter the user key 104 before the user can access encrypted data on the computing device 102. The computing device 102 can also include a device key 106, e.g., a hardware key provided by a manufacturer of the computing device 102. In this manner, the device key 106 can be unique to each computing device 102. In some embodiments, both the device key 106 and the user key 104 are used to encrypt data (again, through various levels of key management/encryption). For example, the device key 106 and the user key 104—and any other number of keys/types of information (e.g., biometric data)—can be combined/modified in any manner to produce a combined key. In other embodiments, the device key 106 can be used to encrypt the user key 104, and the resulting encrypted user key can be used to encrypt certain files 114 in the file system 112 of the computing device 102 through various levels of key management/encryption. For example, and as described in greater detail herein, the combined key can be used to encrypt/decrypt class keys 109, where, in turn, the class keys 109 can be used to encrypt/decrypt extent keys 110 that are used to encrypt file extents 120 of files 114.

As shown in FIG. 1, a key storage 108 can be included in the computing device 102 for storing class keys 109 that can be used to encrypt files 114 of the file system 112 according to different encryption schemes described herein. According to some embodiments, a set of class keys 109 can represent keys that are included in one or more key bags, where the class keys 109 can be used to enforce different encryption policies within the computing device 102. For example, a particular class key 109 in a key bag can only be made available after a user has activated (e.g., logged into, unlocked, etc.) the computing device 102. In this manner, any file extents 120 of files 114 that are encrypted with extent keys 110 that are encrypted using the particular class key 109 will only be available after the computing device 102 is activated. In another example, a particular class key 109 can only be made available after the computing device 102 has connected to an external device, e.g., a network device. In yet another example, a particular class key 109 of a key bag can only be made available when one or more conditions are met, e.g., temporal conditions, locale conditions, connection conditions, activity conditions, and the like. In yet another example, one or more of the key bags—and all keys included therein—can be made available in the same or different manners previously set forth herein. It is noted that foregoing class keys 109/key bags are merely exemplary and that any number/type of class keys/key bags are within the scope of this disclosure.

As noted above, the class keys 109 can be used to encrypt/decrypt extent keys 110, and the extent keys 110 can be used to encrypt/decrypt the files 114 at a file extent level. Encrypting the files 114 can be used to limit the availability of the files 114 to applications 118 stored in an application storage 116 of the computing device 102. As shown in FIG. 1, each file 114 can be comprised of one or more file extents 120, and each file extent 120 can be encrypted by the same extent key 110 or a different extent key 110. Moreover, each of the extent keys 110 (associated with a file 114) can be associated with (i.e., wrapped by) a particular class key 109. According to this configuration, to properly decrypt a file 114, the one or more extent keys 110 used to encrypt the file extents 120 of the file 114 first need to be decrypted using the current class key 109. In turn, the decrypted one or more extent keys 110 can be used to decrypt the file extents 120, thereby permitting entities within the computing device 102 (e.g., applications 118) to access the file 114. A more detailed description for accessing encrypted files 114 is provided below in conjunction with FIG. 2.

Figure 2:
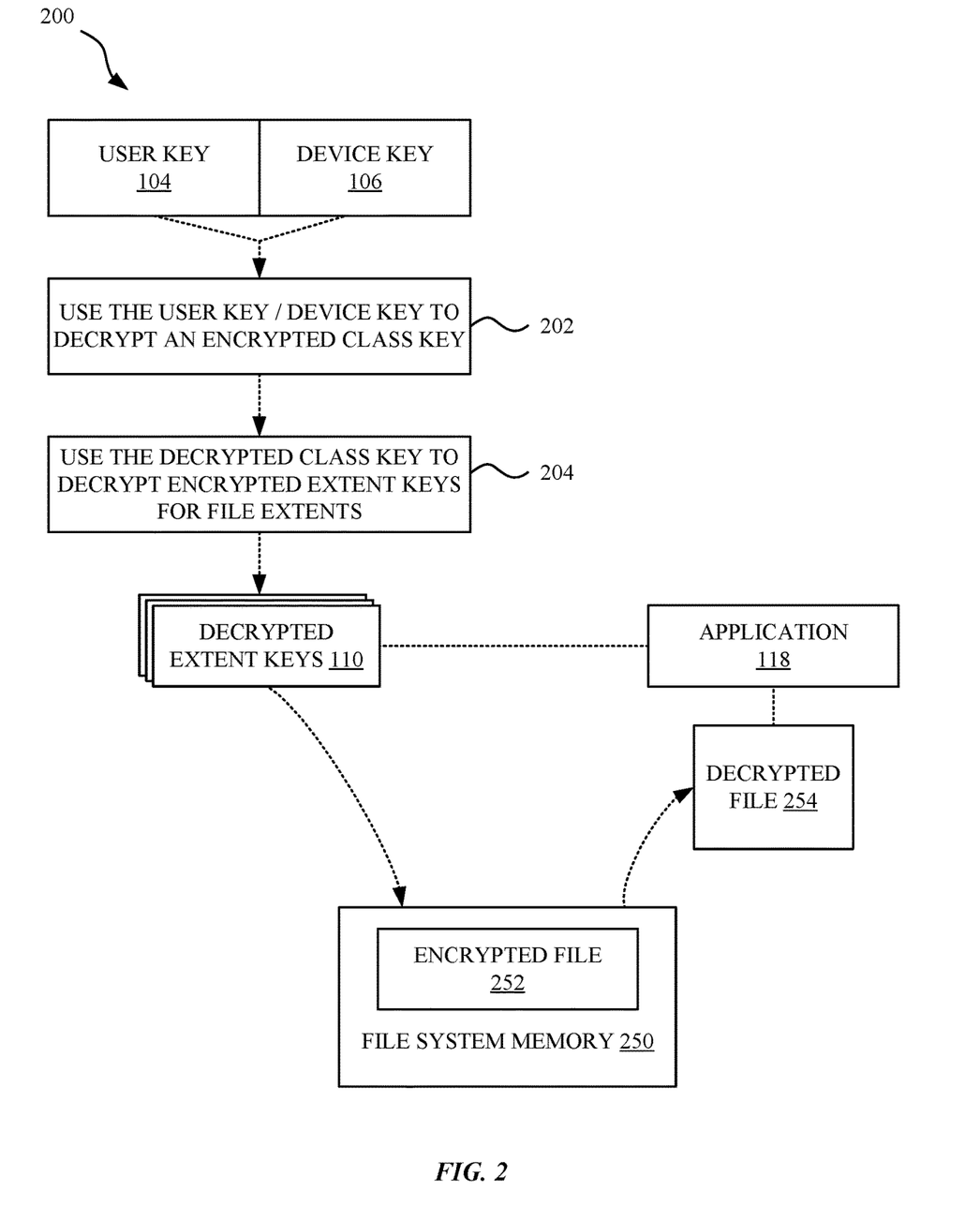
FIG. 2 illustrates a conceptual diagram of an application accessing an encrypted file on a computing device, according to some embodiments.

FIG. 2 illustrates a conceptual diagram 200 of an application accessing an encrypted file, according to some embodiments. As shown in FIG. 2, an application 118 can issue a request to decrypt an encrypted file 252 in a file system memory 250 to produce a decrypted file 254. According to some embodiments, gaining access to one or more decrypted extent keys 110 for decrypting the encrypted file 252 can require both the user key 104 and the device key 106 to decrypt a particular class key 109 associated with the encrypted file 252, which is represented as step 202 in FIG. 2. When the particular class key 109 is decrypted, various encrypted extent keys 110 (associated with the encrypted file 252) can be decrypted using the particular decrypted class key 109, which is represented as step 204 in FIG. 2. In turn, the decrypted extent keys 110 can be used to decrypt different file extents 120 of the encrypted file 252 to produce the decrypted file 254. The decrypted file 254 is thereafter accessible to the application 118.

Figure 3A:
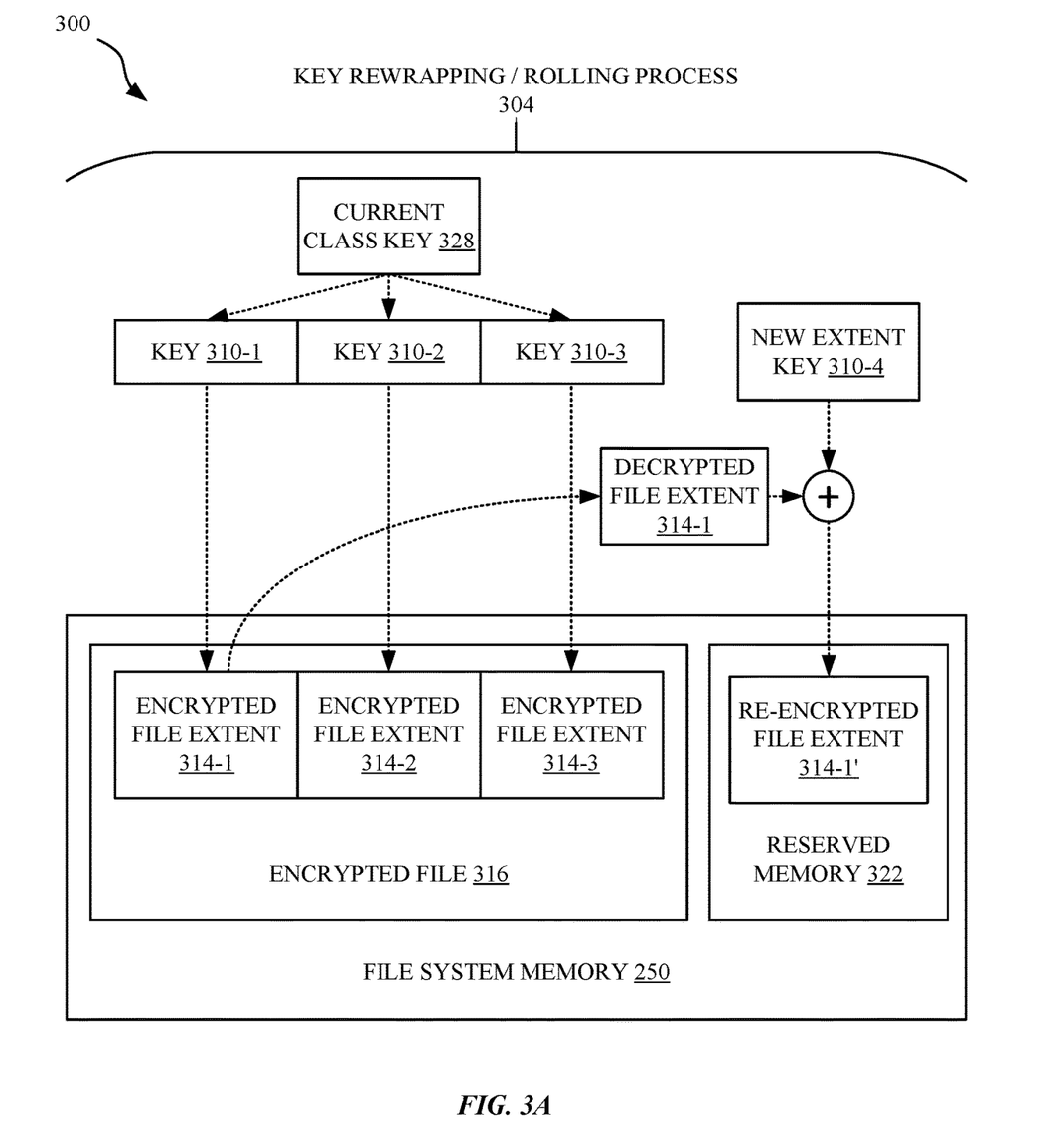
FIGS. 3A-3D illustrate conceptual diagrams of an example key rolling/rewrapping process on an encrypted file on a computing device, according to some embodiments.

FIGS. 3A-3D illustrate conceptual diagrams 300, 325, 350, and 375 of the key manager performing a key rewrapping/(optional) key rolling process 304 on an encrypted file 316, according to some embodiments. As shown in FIG. 3A, the encrypted file 316 is comprised of three different encrypted file extents 314: an encrypted file extent 314-1, an encrypted file extent 314-2, and an encrypted file extent 314-3. As also shown in FIG. 3A, each file extent 314 is respectively encrypted using a different extent key 310, e.g., encrypted file extent 314-1 is encrypted using extent key 310-1, encrypted file extent 314-2 is encrypted using extent key 310-2, and encrypted file extent 314-3 is encrypted using extent key 310-3. As also shown in FIG. 3A, the extent keys 310 are encrypted using a current class key 328 associated with a current encryption class to which the encrypted file 216 is currently assigned.

As mentioned above, the process 304 involves performing an (optional) key rolling process (which is described below in greater detail in conjunction with FIG. 4), as well as a key rewrapping process (which described below in greater detail in conjunction with FIG. 5). For example, a configuration policy can mandate the execution of a key rolling process in conjunction with the key rewrapping process in order to enhance overall security. As described in greater detail in conjunction with FIGS. 3A-3D, the key rolling process involves decrypting/encrypting the file extents 314-1, 314-2, and 314-3 with a new extent key 310-4, and the key wrapping process involves encrypting the new extent key 310-4 with an updated class key 330. It is noted that the process 304 is merely exemplary and that encrypted file 316 can be comprised of any number of encrypted file extents 314 that are encrypted using one or more extent keys 310. Moreover, it is noted that the optional key rolling process involves re-encrypting any number of file extents using one or more updated extent keys.

As illustrated in FIG. 3A, the process 304—in particular, the key rolling process—first involves re-encrypting the encrypted file extent 314-1 using the new extent key 310-4. According to some embodiments, the process 304 involves obtaining the extent key 310-1 for decrypting the encrypted file extent 314-1, where the extent key 310-1 is obtained (i.e., decrypted) using the current class key 328 to which the encrypted file 316 is assigned. Once obtained, the extent key 310-1 can be used to decrypt the encrypted file extent 314-1 to produce a decrypted file extent 314-1. In turn, the process 304 can re-encrypt the decrypted file extent 314-1 using the new extent key 310-4 to produce a re-encrypted file extent 314-1'. It is noted that each of the extent keys/class keys described herein can represent a single key, a key encrypted using one or more keys, and/or one or more keys encrypted with additional data (e.g., a salt value).

As shown in FIG. 3A, the re-encrypted file extent 314-1' can be stored in reserved memory 322. According to some embodiments, the reserved memory 322 represents a portion of the file system memory 250 that can be initially reserved at the beginning of the process 304 in order to mitigate fragmentation of the encrypted file 316. Thereafter, the previous location of the encrypted file extent 314-1 can be marked as unused space in the file system memory 250. However, in some embodiments, the re-encrypted file extent 314-1' can occupy the same location in memory as the encrypted file extent 314-1. When the process 304 completes the re-encryption of the file extent 314-1, the process 304 can proceed to the next stage of the process, which is described below and illustrated in conjunction with FIG. 3B.

Figure 3B:
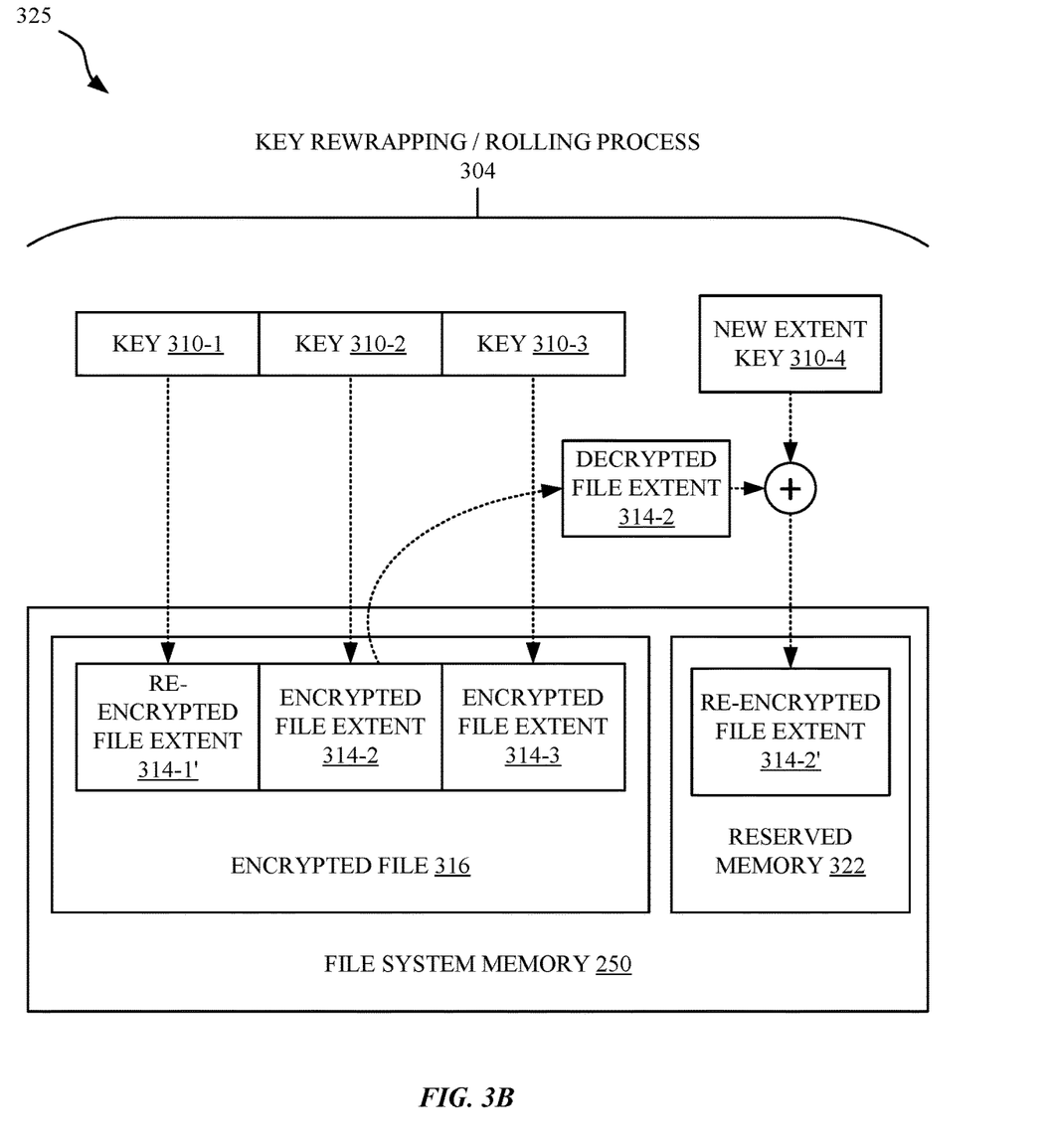

As illustrated in FIG. 3B, the conceptual diagram 325 involves re-encrypting the encrypted file extent 314-2 using the new extent key 310-4. The process 304 involves obtaining (i.e., decrypting) the extent key 310-2 for accessing the encrypted file extent 314-2 of the encrypted file 316. Once obtained, the extent key 310-2 can be used to decrypt the encrypted file extent 314-2 to produce a decrypted file extent 314-2. In turn, the process 304 can re-encrypt the decrypted file extent 314-2 using the new extent key 310-4 to produce a re-encrypted file extent 314-2'. As shown in FIG. 3B, the re-encrypted file extent 314-2' can be stored in reserved memory 322. Thereafter, the previous location of the encrypted file extent 314-2 can be marked as unused space in the file system memory 250. When the process 304 completes the re-encryption of the file extent 314-2, the process 304 can proceed to the next stage of the process, which is described below and illustrated in conjunction with FIG. 3C.

Figure 3C:
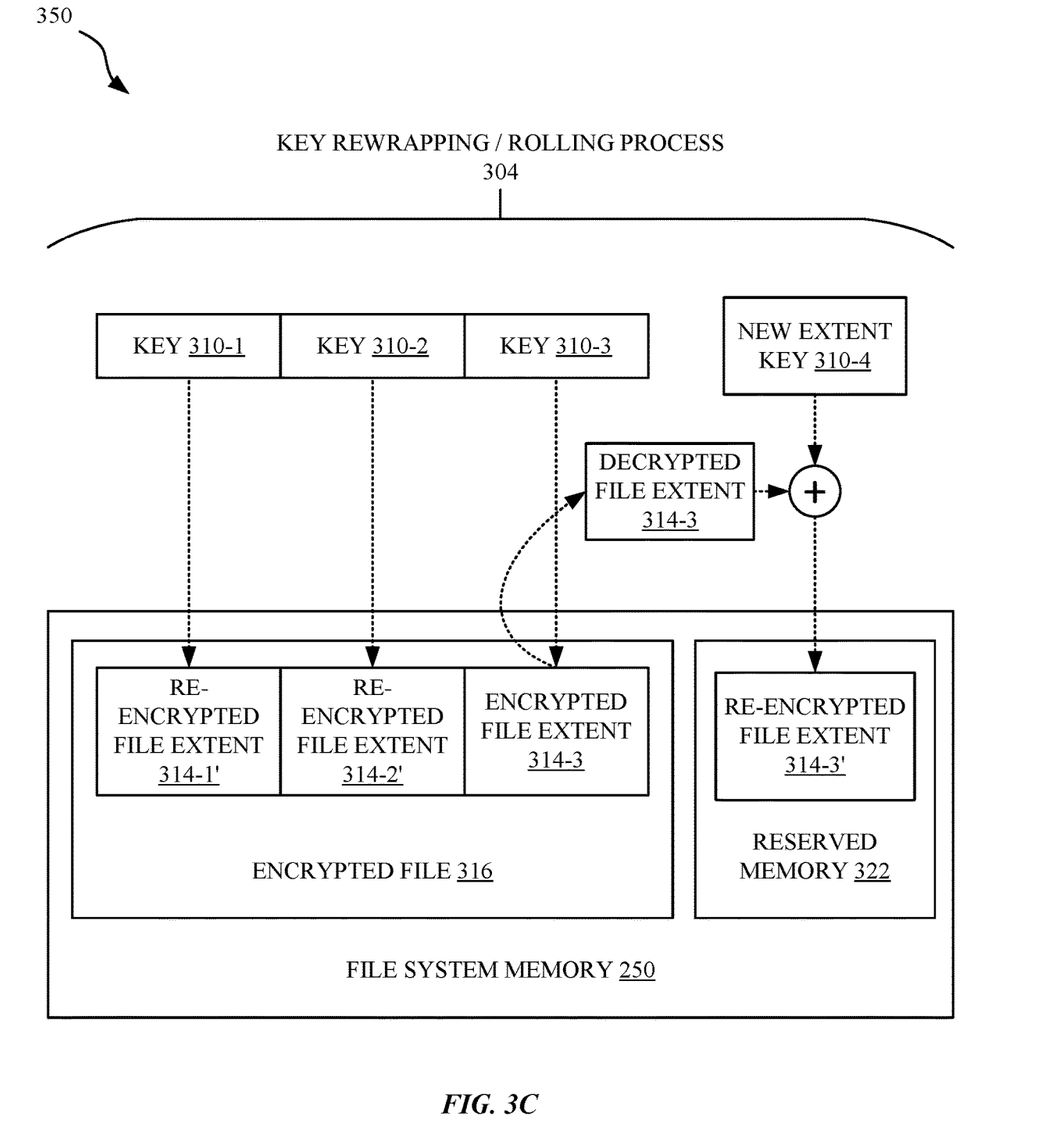

As illustrated in FIG. 3C, the conceptual diagram 350 involves re-encrypting the encrypted file extent 314-3 using the new extent key 310-4. The process 304 involves obtaining (i.e., decrypting) the extent key 310-3 for accessing the encrypted file extent 314-3 of the encrypted file 316. Once obtained, the extent key 310-3 can be used to decrypt the encrypted file extent 314-3 to produce a decrypted file extent 314-3. In turn, the process 304 can re-encrypt the decrypted file extent 314-3 using the new extent key 310-4 to produce a re-encrypted file extent 314-3'. As shown in FIG. 3C, the re-encrypted file extent 314-3' can be stored in reserved memory 322. Thereafter, the previous location of the encrypted file extent 314-3 can be marked as unused space in the file system memory 250. When the process 304 completes the re-encryption of the file extent 314-3, the key rolling process is completed, and the process 304 can return/proceed to the key rewrapping process, which is described below and illustrated in conjunction with FIG. 3D.

It is noted that the process 304 can, in some situations, adjust the manner in which the different file extents of a file are re-encrypted. For example, if a battery of the computing device 102 is low or a processor of the computing device 102 is inundated with a large number of scheduled tasks, then the number of targeted file extents can be reduced. Thereafter, when the battery is no longer low or the processor has a reduced number of scheduled tasks, the number of targeted file extents can be increased.

Figure 3D:
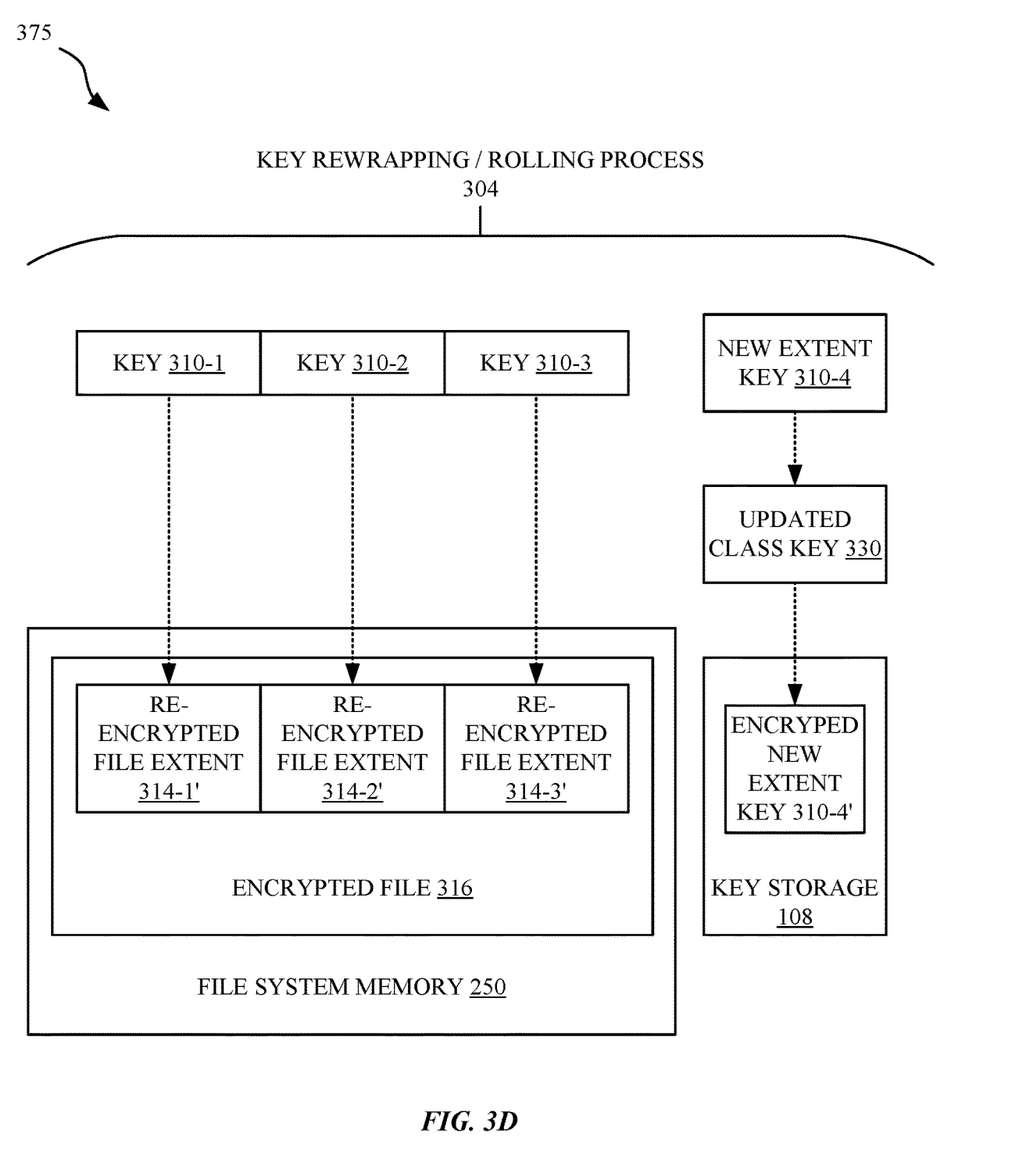

As illustrated in FIG. 3D, the conceptual diagram 375 involves encrypting the new extent key 310-4 with an updated class key 330 to produce an encrypted new extent key 310-4', which finalizes the key rewrapping process. In turn, the encrypted new extent key 310-4' can be stored in the key storage 108 for subsequent retrieval by applications 118 that are permitted to access the updated class key 330 (which can be used to decrypt the encrypted new extent key 310-4').

Figure 4:
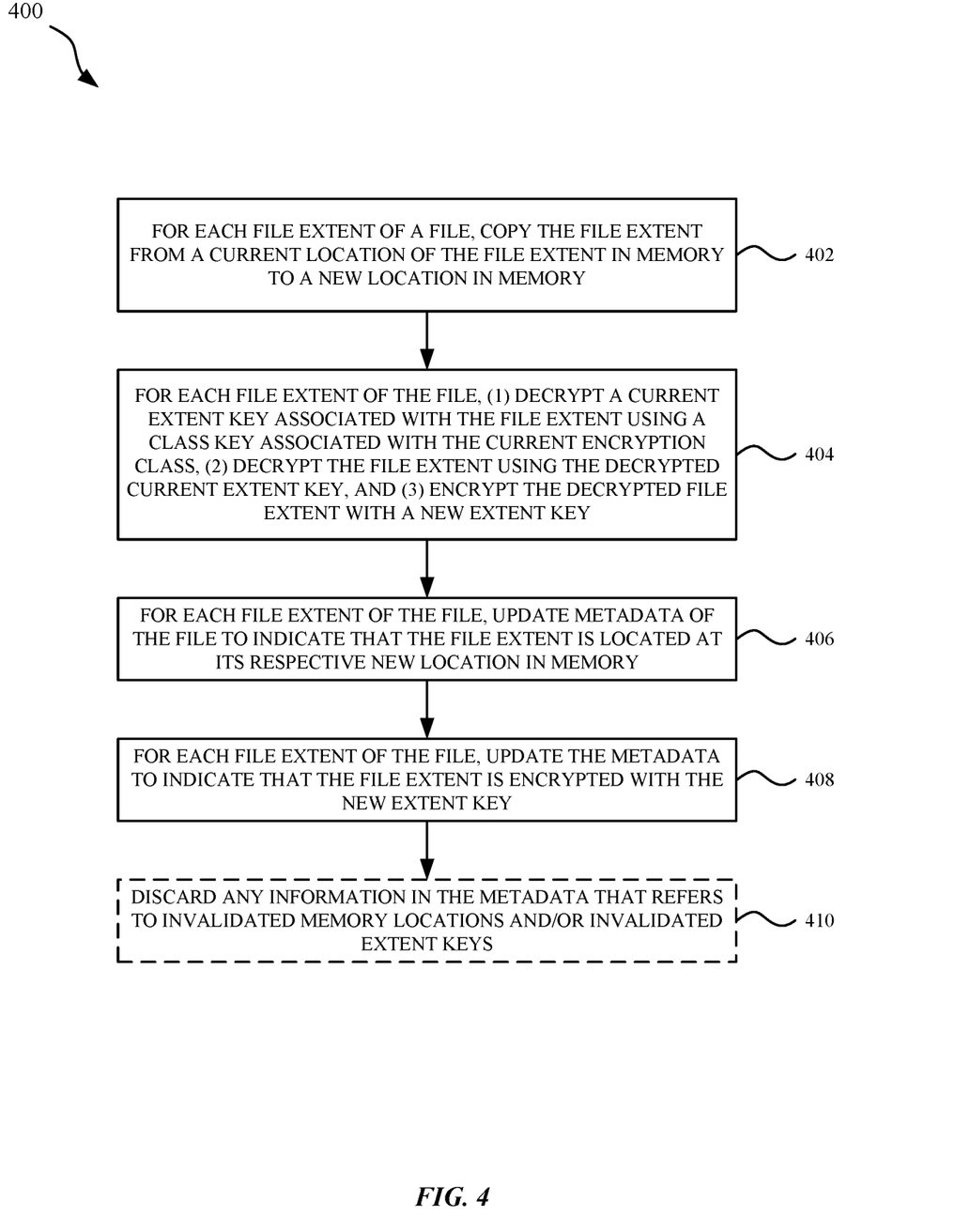
FIG. 4 illustrates a method for performing an optional key rolling process on at least one file extent of a file in conjunction with a key rewrapping process, according to some embodiments.

FIG. 4 illustrates a method 400 for performing an optional key rolling process on at least one file extent of a file in conjunction with a key rewrapping process, according to some embodiments. The method 400 can be performed by any suitable component or module (e.g., an application, a processor, a kernel of the computing device, etc.), e.g., the key manager described herein. As shown in FIG. 4, the method 400 begins at step 402, where the key manager, for each file extent of the file, copies the file extent from its current location in memory to a new location in memory. As previously described herein, and at this stage in the key-rewrapping process, each file extent is encrypted with a current (respective) extent key associated with the file extent, and the current extent key is encrypted with a class key that is associated with the current encryption class to which the file is assigned. Accordingly, step 404 involves, for each file extent of the file, (1) decrypting the current extent key associated with the file extent using the class key associated with the current encryption class, (2) decrypting the file extent using the decrypted current extent key, and (3) encrypting the decrypted file extent with a new extent key. Again, it is noted that it is not necessary for the same extent key to be used to encrypt each file extent, and that any number of extent keys can be used.

At this point, all extents of the file have been re-encrypted using one or more new extent keys. Accordingly, at step 406, the key manager, for each file extent of the file, updates metadata of the file to indicate that the file extent is located at its respective new location in memory. Moreover, at step 408, the key manager, for each file extent of the file, updates the metadata to indicate that the file extent is encrypted with the new extent key. In some embodiments, the metadata can maintain a history information of previous locations/keys associated with the file extents that make up the file. However, in other embodiments, this information can be discarded when possible. For example, at optional/conditional step 410, a check can be performed to determine whether there are other references within the file system that point to the locations and/or the extent keys of the file extents. When no such other references exist, the information can be discarded from the metadata without compromising overall coherency of the file system 112. Step 410 concludes the key rolling process, and, in turn, the key manager can return/proceed to the key rewrapping process, which involves encrypting the one or more new extent keys with a class key (e.g., a class key 109) associated with a different encryption class.

Figure 5:
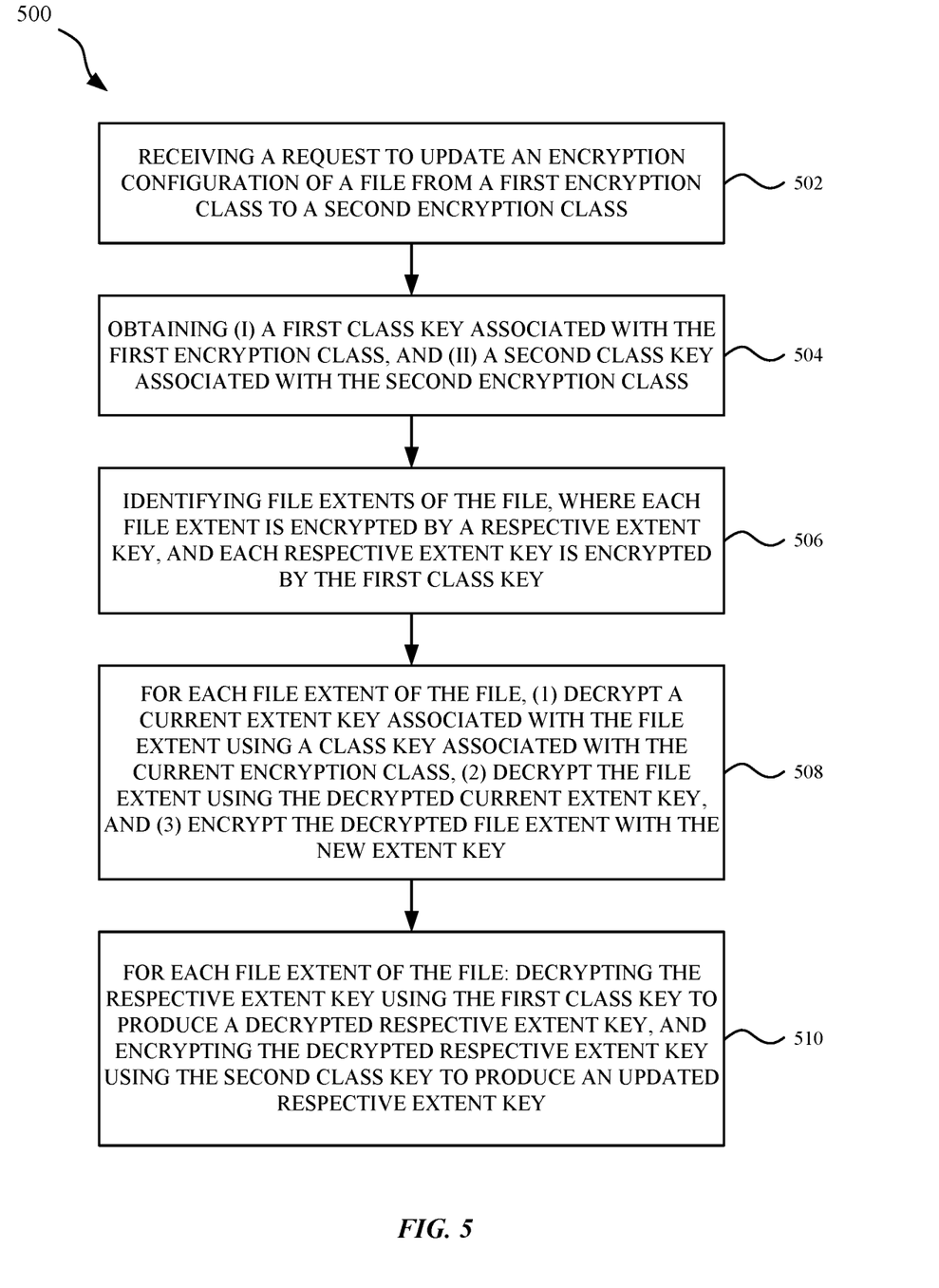
FIG. 5 illustrates a method for performing a key rewrapping process on a file on a computing device, according to some embodiments.

FIG. 5 illustrates a method 500 for performing a key rewrapping process on a file at the computing device 102, according to some embodiments. In particular, the method 500 describes a direct key rewrapping process that excludes the key rolling process described herein. As shown in FIG. 5, the method 500 begins at step 502, and involves the key manager receiving a request to update an encryption configuration of a file from a first encryption class to a second encryption class. This request can be issued, for example, in response to a user logging into the computing device 102 (and establishing a condition in which files should transition from a high level of security to a low level of security), an application modifying its security implementation, and the like. The file can be any suitable type of file stored by the computing device 102, e.g., media data, system data, graphics data, hardware data, device data, and the like.

Step 504 involves the key manager obtaining (i) a first class key associated with the first encryption class, and (ii) a second class key associated with the second encryption class. Step 506 involves the key manager identifying file extents of the file, where each file extent is encrypted by a respective extent key, and each respective extent key is encrypted by the first class key. Step 508 involves, for each file extent of the file: (i) decrypting the respective extent key using the first class key to produce a decrypted respective extent key, and (ii) encrypting the decrypted respective extent key using the second class key to produce an updated respective extent key.

Figure 6:
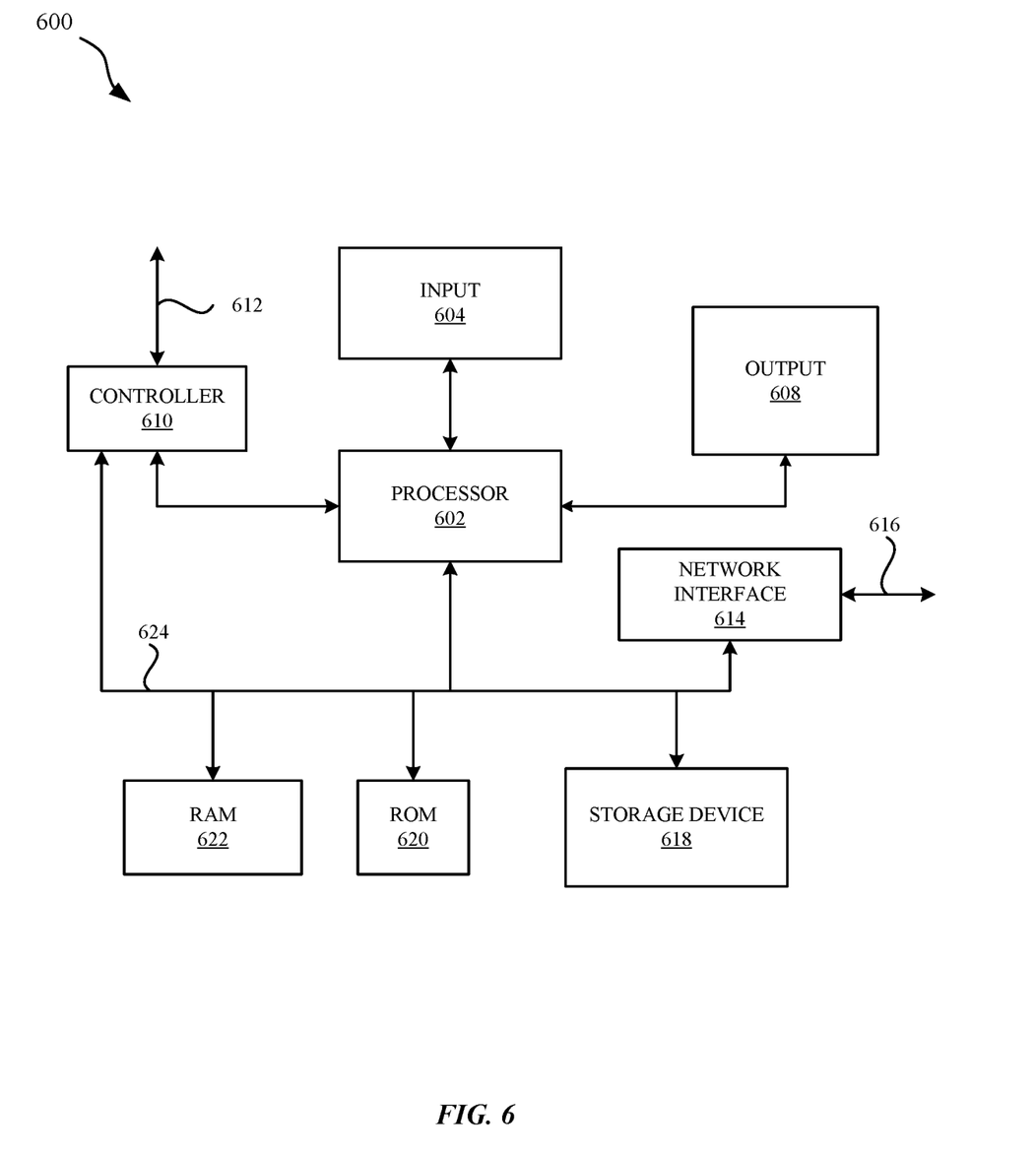
FIG. 6 is a block diagram of components of a computing device or any other suitable device or component for realizing any of the methods, systems, apparatus, and embodiments described herein.

FIG. 6 is a block diagram 600 of components of a computing device (e.g., the computing device 102 of FIG. 1) or any other suitable device or component for realizing any of the methods, systems, apparatus, and embodiments described herein. It will be appreciated that the components, devices or elements illustrated in and described with respect to FIG. 6 may not be mandatory and thus some may be omitted in certain embodiments. As shown in FIG. 6, the computing device 600 can include a processor 602 that represents a microprocessor, a coprocessor, circuitry and/or a controller for controlling the overall operation of computing device 600. Although illustrated as a single processor, it can be appreciated that the processor 602 can include a plurality of processors. The plurality of processors can be in operative communication with each other and can be collectively configured to perform one or more functionalities of the computing device 600 as described herein. In some embodiments, the processor 602 can be configured to execute instructions that can be stored at the computing device 600 and/or that can be otherwise accessible to the processor 602. In this manner, whether configured by hardware or by a combination of hardware and software, the processor 602 can be capable of performing operations and actions in accordance with embodiments described herein.

The computing device 600 can also include user input device 604 that allows a user of the computing device 600 to interact with the computing device 600. For example, user input device 604 can take a variety of forms, such as a button, keypad, dial, touch screen, audio input interface, visual/image capture input interface, input in the form of sensor data, etc. Still further, the computing device 600 can include an output 608 that can be controlled by processor 602. The output 608 can include a display device, audio device, haptic feedback device, or any other output device suitable for providing output to a user of a device. Controller 610 can be used to interface with and control different equipment through equipment control bus 612. The computing device 600 can also include a network/bus interface 614 that couples to data link 616. Data link 616 can allow the computing device 600 to couple to a host computer or to accessory devices. The data link 616 can be provided over a wired connection or a wireless connection. In the case of a wireless connection, network/bus interface 614 can include a wireless transceiver.

The computing device 600 can also include a storage device 618, which can have a single disk or a plurality of disks (e.g., hard drives) and a storage management module that manages one or more partitions (also referred to herein as "logical volumes") within the storage device 618. In some embodiments, the storage device 618 can include flash memory, semiconductor (solid state) memory or the like. Still further, the computing device 600 can include Read-Only Memory (ROM) 620 and Random Access Memory (RAM) 622. The ROM 620 can store programs, code, instructions, utilities or processes to be executed in a non-volatile manner. The RAM 622 can provide volatile data storage, and store instructions related to components of the storage management module that are configured to carry out the various techniques described herein. The computing device 600 can further include data bus 624. Data bus 624 can facilitate data and signal transfer between at least processor 602, controller 610, network/bus interface 614, storage device 618, ROM 620, and RAM 622.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable storage medium. The computer readable storage medium can be any data storage device that can store data, which can thereafter be read by a computer system. Examples of the computer readable storage medium include read-only memory, random-access memory, CD-ROMs, HDDs, DVDs, magnetic tape, and optical data storage devices. The computer readable storage medium can also be distributed over network-coupled computer systems so that the computer readable code is stored and executed in a distributed fashion. In some embodiments, the computer readable storage medium can be non-transitory.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing security on a computing device, the method comprising, at the computing device:
   receiving a user key in conjunction with a successful login that occurs on the computing device;
   forming a combined key based on (i) the user key, and (ii) a device key that is unique to the computing device;
   accessing an encryption key bag using the combined key, wherein the encryption key bag stores a plurality of encryption keys, and the plurality of encryption keys includes a first class key associated with a first encryption class; and
   in response to identifying a satisfaction of at least one condition associated with modifying at least one file from the first encryption class to a second encryption class:
      obtaining a second class key associated with the second encryption class,
      identifying a plurality of file extents of the at least one file, wherein each file extent is encrypted by a respective extent key, and each respective extent key is encrypted by the first class key, and
      for each file extent of the at least one file:
         decrypting the respective extent key using the first class key to produce a decrypted respective extent key, and
         encrypting the decrypted respective extent key using the second class key to produce an updated respective extent key.

2. The method of claim 1, further comprising, for each file extent of the at least one file:
   reserving a respective new portion of memory in a storage device for the file extent,
   decrypting the file extent with the decrypted respective extent key to produce a decrypted file extent,
   encrypting the decrypted file extent with a new respective extent key to produce a new encrypted file extent, and
   storing the new encrypted file extent into the respective new portion of memory.

3. The method of claim 2, wherein the method further comprises, for each file extent of the at least one file, and subsequent to encrypting the decrypted file extent with the new respective extent key:
   updating metadata associated with the at least one file to indicate that:
      (i) the file extent is encrypted with the new respective extent key, and
      (ii) the file extent is stored in the respective new portion of memory in the storage device.

4. The method of claim 3, further comprising:
   discarding any information in the metadata that refers to invalidated storage locations and/or invalidated extent keys.

5. The method of claim 3, further comprising, for each file extent of the at least one file, and prior to decrypting the file extent with the decrypted respective extent key:
   locking the file extent from being accessed.

6. The method of claim 1, wherein at least a first file extent of the file extents is encrypted by a first extent key and a second file extent of the file extents is encrypted by a second extent key that is different from the first extent key, and the first extent key and the second extent key are encrypted using the first class key.

7. The method of claim 6, wherein, subsequent to processing the file extents of the at least one file, the first extent key and the second extent key are encrypted using the second class key.

8. The method of claim 1, wherein the at least one condition comprises:
   an unlock event of the computing device,
   at least one operation occurring within a file system of the computing device,
   at least one temporal condition,
   at least one locale condition, and/or
   at least one connection condition.

9. A non-transitory computer readable storage medium configured to store instructions that, when executed by a processor included in a computing device, cause the computing device to manage encryption of a file, by carrying out steps that include:
   receiving a user key in conjunction with a successful login that occurs on the computing device;
   forming a combined key based on (i) the user key, and (ii) a device key that is unique to the computing device;
   accessing an encryption key bag using the combined key, wherein the encryption key bag stores a plurality of encryption keys, and the plurality of encryption keys includes a first class key associated with a first encryption class; and
   in response to identifying a satisfaction of at least one condition associated with modifying at least one file from the first encryption class to a second encryption class:
      obtaining a second class key associated with the second encryption class,
      identifying a plurality of file extents of the at least one file, wherein each file extent is encrypted by a respective extent key, and each respective extent key is encrypted by the first class key, and
      for each file extent of the at least one file:
         decrypting the respective extent key using the first class key to produce a decrypted respective extent key, and
   encrypting the decrypted respective extent key using the second class key to produce an updated respective extent key.

10. The non-transitory computer readable storage medium of claim 9, wherein at least a first file extent of the file extents is encrypted by a first extent key and a second file extent of the file extents is encrypted by a second extent key that is different from the first extent key, and the first extent key and the second extent key are encrypted using the first class key.

11. The non-transitory computer readable storage medium of claim 10, wherein, subsequent to processing the file extents of the at least one file, the first extent key and the second extent key are encrypted using the second class key.

12. The non-transitory computer readable storage medium of claim 9, wherein the at least one condition comprises:
   an unlock event of the computing device,
   at least one operation occurring within a file system of the computing device,
   at least one temporal condition,
   at least one locale condition, and/or
   at least one connection condition.

13. The non-transitory computer readable storage medium of claim 9, wherein the steps further include, for each file extent of the at least one file:
   reserving a respective new portion of memory in a storage device for the file extent,
   decrypting the file extent with the decrypted respective extent key to produce a decrypted file extent,
   encrypting the decrypted file extent with a new respective extent key to produce a new encrypted file extent, and
   storing the new encrypted file extent into the respective new portion of memory.

14. The non-transitory computer readable storage medium of claim 13, wherein the steps further include, for each file extent of the at least one file, and subsequent to encrypting the decrypted file extent with the new respective extent key:
   updating metadata associated with the at least one file to indicate that:
      (i) the file extent is encrypted with the new respective extent key, and
      (ii) the file extent is stored in the respective new portion of memory in the storage device.

15. A computing device configured to manage encryption of a file, the computing device comprising:
   a processor; and
   a memory storing instructions that, when executed by the processor, cause the processor to carry out steps that include:
      receiving a user key in conjunction with a successful login that occurs on the computing device;
      forming a combined key based on (i) the user key, and (ii) a device key that is unique to the computing device;
      accessing an encryption key bag using the combined key, wherein the encryption key bag stores a plurality of encryption keys, and the plurality of encryption keys includes a first class key associated with a first encryption class; and
      in response to identifying a satisfaction of at least one condition associated with modifying at least one file from the first encryption class to a second encryption class:
         obtaining a second class key associated with the second encryption class,
         identifying a plurality of file extents of the at least one file, wherein each file extent is encrypted by a respective extent key, and each respective extent key is encrypted by the first class key, and
         for each file extent of the at least one file:
            decrypting the respective extent key using the first class key to produce a decrypted respective extent key, and
            encrypting the decrypted respective extent key using the second class key to produce an updated respective extent key.

16. The computing device of claim 15, wherein at least a first file extent of the file extents is encrypted by a first extent key and a second file extent of the file extents is encrypted by a second extent key that is different from the first extent key, and the first extent key and the second extent key are encrypted using the first class key.

17. The computing device of claim 16, wherein, subsequent to processing the file extents of the at least one file, the first extent key and the second extent key are encrypted using the second class key.

18. The computing device of claim 15, wherein the at least one condition comprises:
   an unlock event of the computing device,
   at least one operation occurring within a file system of the computing device,
   at least one temporal condition,
   at least one locale condition, and/or
   at least one connection condition.

19. The computing device of claim 15, wherein the steps further include, for each file extent of the at least one file:
   reserving a respective new portion of memory in a storage device for the file extent,
   decrypting the file extent with the decrypted respective extent key to produce a decrypted file extent,
   encrypting the decrypted file extent with a new respective extent key to produce a new encrypted file extent, and
   storing the new encrypted file extent into the respective new portion of memory.

20. The computing device of claim 19, wherein the steps further include, for each file extent of the at least one file, and subsequent to encrypting the decrypted file extent with the new respective extent key:
   updating metadata associated with the at least one file to indicate that:
      (i) the file extent is encrypted with the new respective extent key, and
      (ii) the file extent is stored in the respective new portion of memory in the storage device.

* * * * *